June 20, 1961 T. P. FARKAS 2,988,875
AFTERBURNER FUEL CONTROL HAVING MULTIPLE SETS OF NOZZLES
Filed Nov. 21, 1956 3 Sheets-Sheet 1

INVENTOR
THOMAS P. FARKAS
BY
ATTORNEY

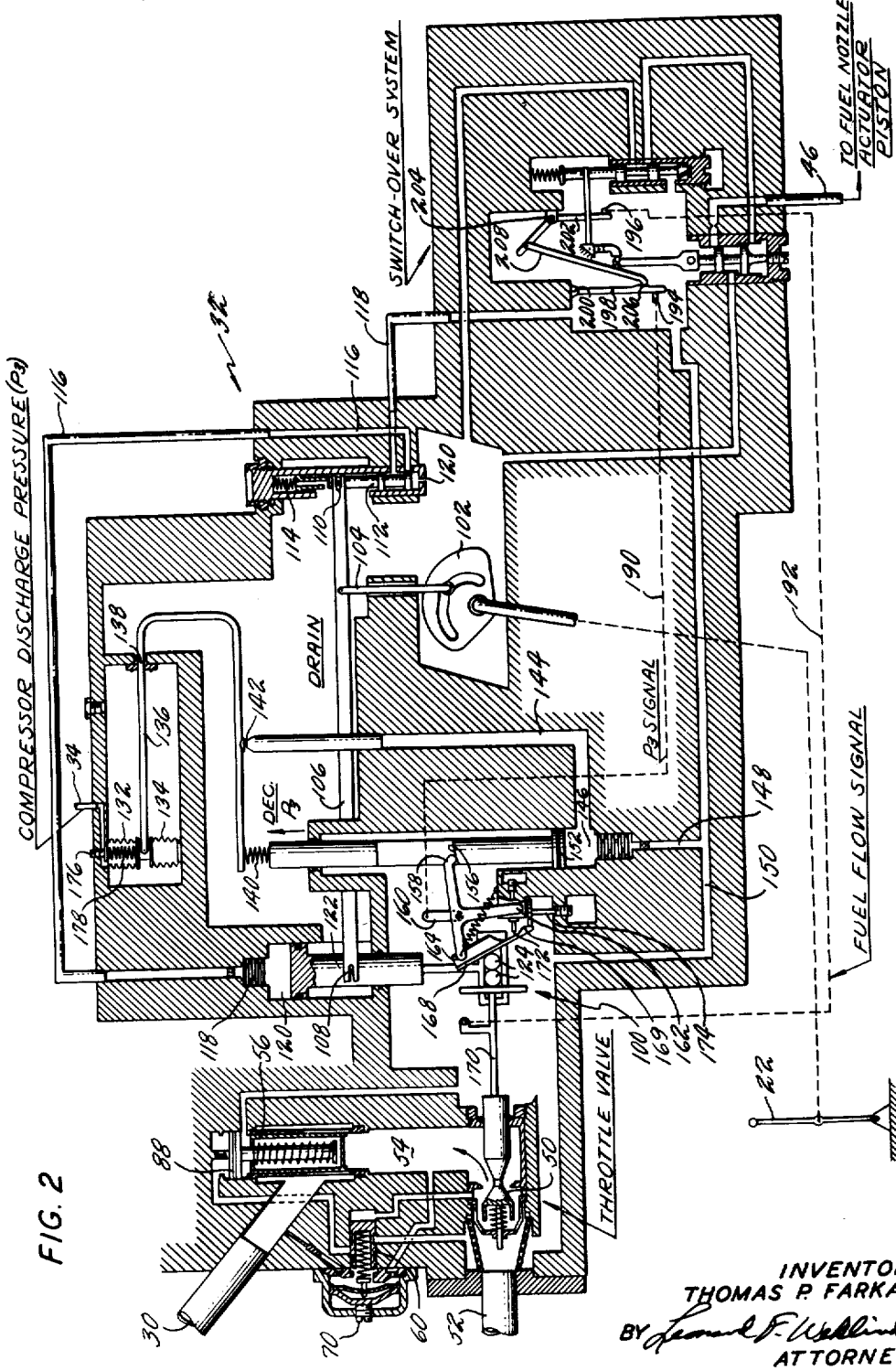

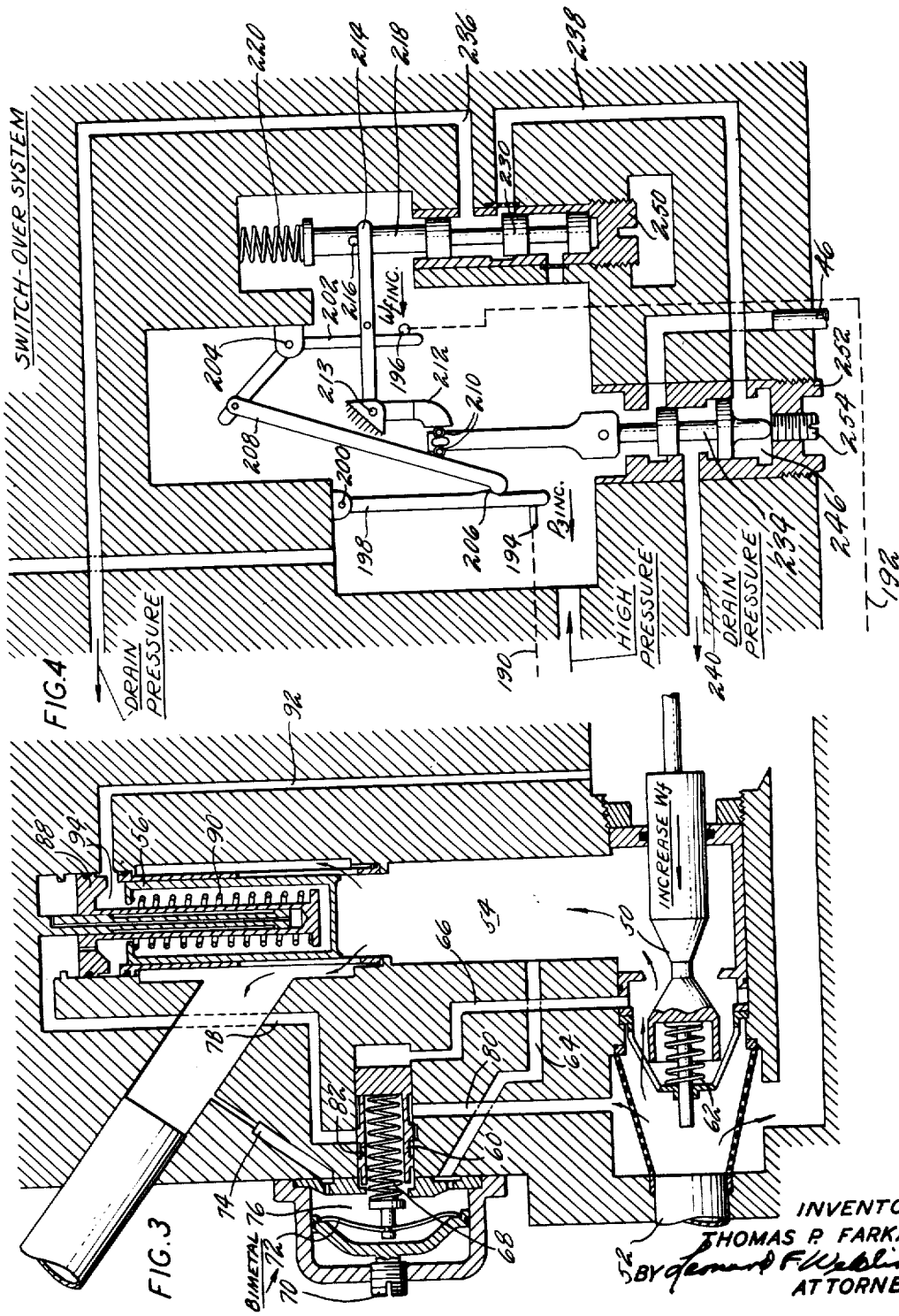

United States Patent Office 2,988,875
Patented June 20, 1961

2,988,875
AFTERBURNER FUEL CONTROL HAVING MULTIPLE SETS OF NOZZLES
Thomas P. Farkas, Bloomfield, Conn., assignor to United Aircraft Corporation, East Hartford, Conn., a corporation of Delaware
Filed Nov. 21, 1956, Ser. No. 623,620
14 Claims. (Cl. 60—35.6)

This invention relates to fuel controls and more particularly to fuel controls for turbine type power plants having afterburners.

It is an object of this invention to provide a fuel control for an afterburner of a turbine type power plant.

It is a further object of this invention to provide a fuel control having a throttle valve for regulating fuel flow and two sets of fuel nozzles with switch-over means for further regulating the flow to at least one set of nozzles depending upon certain operating conditions.

It is a still further object of this invention to provide a fuel control of the type described wherein the switch-a fuel control of the type described wherein the switch-over means is operative in response to a predetermined ratio of afterburner fuel flow to compressor discharge pressure.

Another feature of this invention is the provision of means for adjusting the maximum and minimum flow limits or lines for the throttle valve.

These and other objects of this invention will become readily apparent from the following description of the drawings in which:

FIG. 2 is a schematic illustration of the afterburner fuel control;

FIG. 3 is an enlarged detailed showing of the throttle valve and pressure regulator portion of the FIG. 2 control;

FIG. 4 is an enlarged detailed showing of the switch-over portion of the FIG. 2 control;

Figure 1:
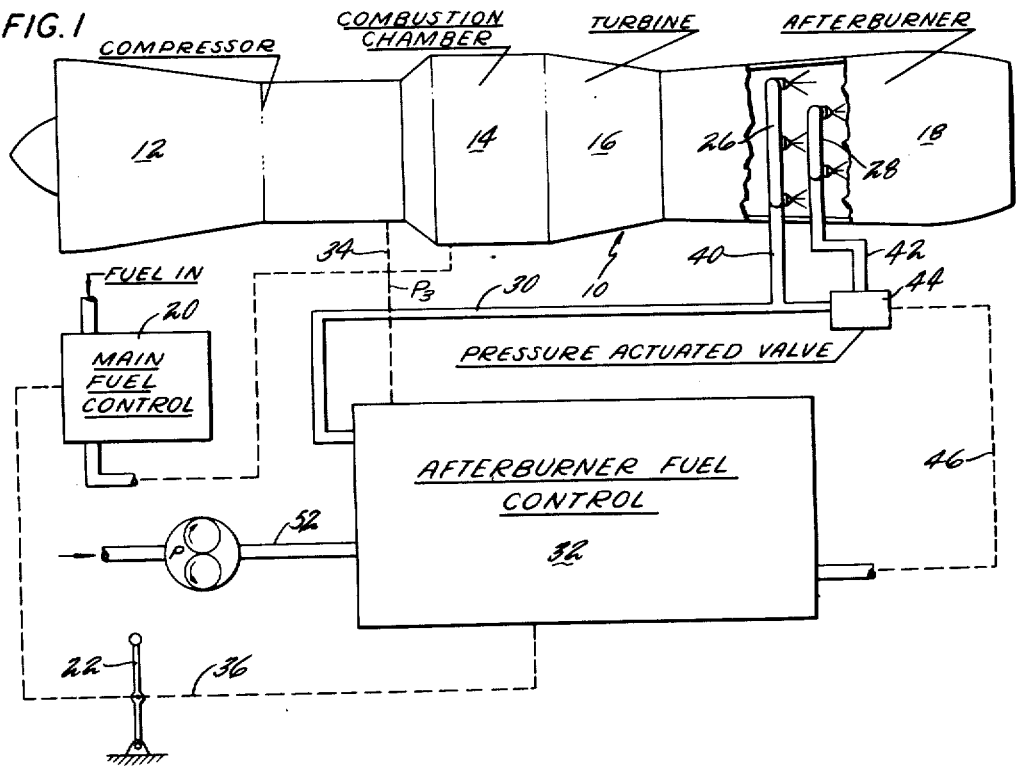
FIG. 1 is a schematic illustration of a turbojet engine having an afterburner and a fuel control for the afterburner.

Referring to FIG. 1, a turbojet engine is generally indicated at 10 as having a compressor 12, a combustion chamber 14, a turbine section 16, and an afterburner 18. The combustion chamber 14 is fed fuel from a main fuel control 20 which may be controlled by a power lever 22. The afterburner 18 has fuel fed thereto by two sets of fuel nozzles 26 and 28. Both sets of fuel nozzles 26 and 28 receive fuel from a main line 30 which connects with the afterburner fuel control 32. The afterburner fuel control receives a compressor discharge pressure signal ($P_3$) via the line 34 and also receives a power lever signal via the line 36.

The main afterburner fuel control line 30 divides into two separate lines 40 and 42. The line 40 continuously feeds fuel to the nozzles 26 while the line 42 feeds fuel to the nozzles 28 depending on certain operative conditions. Thus, a pressure actuated valve 44 is in the line 42 and is opened or closed by a pressure signal from the line 46 which connects to the afterburner fuel control. These particular operative conditions will be described hereinafter in connection with the afterburner fuel control switch-over system.

The afterburner fuel control 32 is schematically illustrated in FIG. 2. This control comprises a throttle valve 50 which receives fuel under pressure via the line 52 and meters this fuel to the line 54. A pressure regulating valve 56 is in series with the throttle valve 50 and regulates the pressure drop across the throttle valve 50 by further throttling the fuel flow to the line 30. The pressure regulating valve 56 herein is a reset type pressure regulating valve similar to the type described in Patent application Serial No. 611,339 filed September 21, 1956, by Mr. Thomas P. Farkas. The pressure regulating valve 56 is controlled by a pilot valve 60. The throttle valve and pressure regulator are better illustrated in FIG. 3. Referring to this figure, the throttle valve 50 is shown as being biased toward a closed position by a spring 62. Fluid passes the throttle valve 50 and then flows to the line 54 where it is further throttled by the pressure regulating valve 56 before it flows to the line 30. The pilot valve 60 has the left-hand end thereof subjected to pressure on the downstream side of the throttle valve by means of a line 64. The right-hand side of the pilot valve 60 is subjected to pressure on the upstream of the throttle valve via a line 66. The pressure drop to be regulated is affected by the spring 68 which may be adjusted by the screw 70. Incidentally, a bimetallic spring 72 is provided to adjust the pressure drop slightly for variation in fuel temperature and density. A small bleed line 74 is provided to insure that the chamber 76 on the left-hand end of the pilot valve 60 gets a circulation of fuel therethrough.

The pilot valve 60 connects the line 78 either to the high pressure line 80 or a low pressure source via the passage 82. This fluid under pressure is conducted to the chamber 86 and acts on the piston 88 which varies the compression of a spring 90. The spring 90 acts against high pressure which is conducted from the line 92 to the chamber 94. Variation in the position of the piston 88 and the compression of the spring 90 regulates the position of the pressure regulating valve 56.

The throttle valve 50 (see FIG. 2) is positioned by a multiplying linkage generally indicated at 100. The multiplying linkage receives signals corresponding to power lever position and to compressor discharge pressure ($P_3$). Thus, when the power lever 22 is moved, the cam 102 is rotated thereby moving link 104 and pivoting the arm 106 about its left end 108. This in turn moves the right end 110 of the arm 106 to reciprocate the pilot valve 112. Movement of the pilot valve 112 against the pressure of spring 114 connects the line 116 either with high pressure from the line 118 or to drain via the passage 120. Fluid in the line 116 is conducted through a stacked orifice 118 into the chamber 120 at the top of the servo piston 122. When the pilot valve 112 moves in a certain direction, fluid under pressure or drain is connected to the line 116 and chamber 120 to reposition the servo piston 122. Motion of the piston 122 pivots the arm 106 so that the pilot valve 112 recenters itself to a neutral position. The power lever position then is transmitted as a signal from the servo piston 122 to the rollers 124 in the multiplying linkage. Thus a signal proportional to the position of the power lever is fed into the multiplying linkage which may have a linear or nonlinear relationship.

Figure 5:
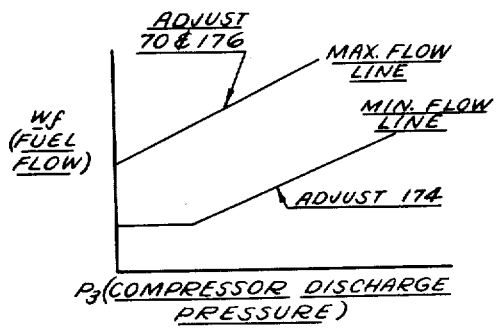
FIG. 5 is a graphic illustration of the maximum and minimum flow limits.

The multiplying or combining mechanism 100 also receives a compressor discharge pressure signal via a line 34. This pressure is led to a bellows 132 which is opposed by an evacuated bellows 134 so that a resultant absolute pressure signal is obtained. Expansion and contraction of the bellows 132 moves the linkage 136 about a pivot 138 against the pressure of a balancing spring 140. Motion of the linkage 136 varies the opening of an orifice 142 so as to vary the pressure in the line 144 and the chamber 146. The chamber 146 is continuously fed fluid under high pressure via a line 148 leading from the line 150. The compressor discharge pressure signal is provided in this manner with a force balance system. Thus, when the orifice 142 is varied in its opening and the pressure in the chamber 146 is varied, the servo piston 152 is moved sufficiently so that the spring 140 is compressed or relaxed sufficiently to balance out the forces which first tended to vary the opening of the orifice 142. Movement of the servo piston 152 vertically varies the position of a cam 156 and a cam follower 158. The cam follower 158 carries an arm 160 and is pivoted at 162. The cam follower 158 has its left-hand end 164 operating a member 168 which bears against the rollers 124. Thus, the motion of the member 168 and the rollers 124 is multiplied to thereby actuate the stem 170 of the throttle valve 50. The member 168 includes two adjustable stops 172 and 174 which affect the minimum flow limits of the throttle valve 50. Another adjustment 176 adjusts a spring 178 which acts on the compressor discharge pressure bellows 132. The maximum fuel flow line shown in FIG. 5 is adjusted by the adjustment 70 on the pressure regulating pilot valve 60 and also the adjustment 176 on the compressor discharge pressure bellows 132 and its spring 178. The adjustment 174 in the multiplying linkage provides the slope for the minimum flow line of FIG. 5, while the adjustable stop 172 provides the flat portion of the minimum flow line. Thus, the throttle valve 50 may be limited in its maximum and minimum openings and these limits may be adjusted similar to the curves shown in FIG. 5. The slope of these curves may be adjusted as desirable for the necessary operating conditions to be encountered.

The member 168 has a cam surface 169 which engages the crossbar of adjustable element 174 and provides the slope and/or contour of the right-hand portion of the minimum flow line of FIG. 5. Thus, the upper part of member 168 (FIG. 2) moves in proportion to a compressor discharge pressure signal while the bottom part or cam 169 provides a motion independent of the compressor discharge signal. A resultant throttle valve motion of the two motions may be obtained when the rollers 124 are in a proper position. In summary, the cam portion 169 of member 168 effects the output of rollers 124 in one manner in the extreme position shown for different values of compressor discharge pressure. As member 168 moves about its pivot 162 the cam and slides down to maintain a desired output of rollers 124 (in this case linear but sloped) to compensate for motion about the pivot 162. After the cam 169 slides down a given amount the adjustable stop 172 then takes effect.

The lower right-hand corner of Fig. 2 shows the switch-over system of this fuel control. This system receives a signal proportional to compressor discharge pressure ($P_3$) via the dotted line 190 and a signal proportional to fuel flow or throttle valve position via the line 192. The signal from the line 190 is received at 194 (see also FIG. 4) in the switch-over system, while the signal from the line 192 is received at the point 196 in the switch-over system. The compressor discharge pressure signal at 194 operates on an arm 198 so as to move it to the left or right about its pivot at 200. The fuel flow signal received at 196 operates on an arm 202 which pivots about the point 204. The arm 198 includes a cam 206 to nullify nonlinearities in the compressor discharge pressure signal on the response of the linkage. A cam follower 208 is positioned at a certain angle and engages a pair of rollers 210 which also engage a bell crank type of arm 212, which in turn has its horizontal arm 214 engaging a pin 216 on the valve stem 218. The valve stem 218 is biased in a downward direction by a spring 220.

It should be kept in mind that the switch-over system is intended to send a pressure signal via the line 46 to open up the valve 44 (FIG. 1) to provide fuel flow through a second set of fuel nozzles 28 in the afterburner when a particular ratio of fuel flow to compressor discharge pressure exists. When this particular ratio occurs, it is desired to immediately open the valve 44 to provide flow through the second set of nozzles while avoiding any dwell region. Therefore, the switch-over system incorporates a positive feed-back so that any start of a motion in one direction will result in a continued motion in that direction at an ever increasing rate.

Primarily the pilot valve 230 carried by valve stem 218 controls the switch-over valve 234. The pilot valve 230 in the position shown is feeding low pressure fluid or fluid at drain pressure from the line 236 to the line 238. The line 238 leads to the bottom of the switch-over valve 234. The switch-over valve 234 in turn in the position shown leads high pressure fluid to the line 46 thereby opening the second bank of fuel nozzles 28 (FIG. 1). When high pressure fluid is fed to the bottom of the switch-over valve 234, then fluid under drain pressure is fed from the line 240 to the line 46.

Figure 6:
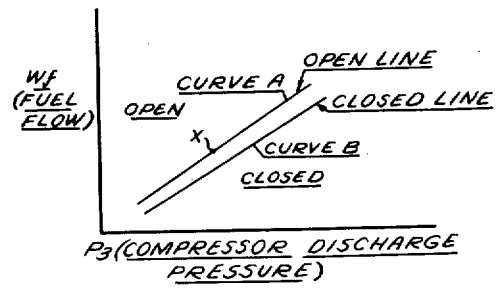
FIG. 6 is a graphic illustration of the switch-over system operating lines.

By way of example, assume that compressor discharge pressure ($P_3$) and fuel flow ($W_f$) are as shown at point X on curve A of FIG. 6. Now still referring to FIG. 4 under these conditions the pilot valve 230 will be in a line on line or neutral position. If the $W_f$ signal increases, the element will move to the left, thereby allowing arm 198 to move toward the left about its pivot, thereby further allowing the rollers 210 to move to the left. This permits the bell crank 212 to move about its pivot 213 in a clockwise direction. With this action the pilot valve 230 moves in a downward direction and opens line 236 to line 238 whereby drain pressure is introduced to the bottom chamber 246 permitting the switch-over valve 234 to move downward. When this downward motion begins, the rollers 212, due to the slope of the link 208, are allowed to move farther to the left, following which the bell crank 212 is moved farther clockwise and the pilot valve 230 is moved farther in a downward direction. As a result, the snap action valve 234 is snapped downwardly to provide the desired high pressure signal to the line 46.

In order for the snap action valve to move in the other direction, the built-in hysteresis requires that the fuel flow, for example, reduces to a point past its original position before it snaps in an opposite direction or toward the nozzle closed position. The open and closed lines of operation, for example, are shown in FIG. 6. In other words, these lines are not identical.

By example then, should fuel flow begin to decrease, member 194 would move to the right, and since the rollers 210 are now in a new location along the length of lever 208, the effect of this movement starts to show at the pilot valve 230 at a different time (FIG. 6). The pilot valve 230 reaches the line on line or neutral position a little later than previously because of this change in ratio. As the pilot valve 230 moves in an upward direction, it opens line 238 to high pressure and the switch-over valve 234 begins to move up, thereby causing further movement of the pilot valve and a repetition of the snap action described above. It should be noted that for any steady state condition, the pilot valve 230 conducts either high or drain pressure fluid to the chamber 246 of snap action valve 234 but does not meter an intermediate pressure to the switch-over servo valve 234. Although immediately above the action of the system was described in connection with a varying fuel flow, a varying compressor discharge pressure signal will likewise affect the system. In actual operation both signals are acting concurrently.

The curves A and B of FIG. 6 can be shifted up or down a constant amount by adjustment of the sleeve 250 which surrounds the pilot valve 230. The sleeve 252 which surrounds the snap action servo valve 234 alters the slope of both curves A and B of FIG. 6, thus effecting a change in the switch-over ratio. Similarly, the adjustment 254 at the bottom of the switch-over valve sleeve 252 controls the amount of the built-in hysteresis; namely, the space between curves A and B of FIG. 6. It should be noted that the switch-over line can be made nonlinear by suitable contouring of cam 206.

As a result of this invention it will become apparent that a highly efficient and accurate afterburner fuel control system has been provided including a switch-over system.

Although only one embodiment of this invention has been illustrated and described herein, it will become apparent that various changes and modifications may be made in the construction and arrangement of the various parts without departing from the scope of this novel concept.

What is desired by Letters Patent is:

1. In a power plant having a compressor and a main combustion chamber and an afterburner, means for regulating the flow of fuel to said afterburner, means including two sets of nozzles for receiving fuel from said regulating means and injecting fuel into said afterburner, and means responsive to a predetermined ratio of a function of the fuel flow through said regulating means and compressor discharge pressure for regulating the flow of fuel through one of said sets of nozzles.

2. In a fuel control for a power plant including a combustion section, means for regulating the flow of fuel to said combustion section including a movable valve, second means for further controlling the flow of fuel to said combustion section, a plurality of sets of nozzles receiving fuel from said second means for injecting fuel into said combustion section, and means responsive to the position of said movable valves and a pressure of the gas flowing through the power plant for controlling the fuel flow through only one of said sets of nozzles.

3. In a fuel control for a gas turbine power plant including a combustion section, means for regulating the flow of fuel to said combustion section, a power lever, means responsive to the position of said power lever and a pressure of the gases flowing through the power plant for controlling said regulating means including means providing an indication of fuel flow, a plurality of nozzles receiving fuel from said regulating means for injecting fuel into said combustion section, and means responsive to said fuel flow indicating means and a pressure of the gases flowing through the power plant for controlling the flow of fuel through at least one of said nozzles, said last mentioned means including a snap action servo system.

4. In a fuel control for a gas turbine power plant including a combustion section, means for regulating the flow of fuel to said combustion section, and providing a fuel flow signal, a power lever, means responsive to the position of said power lever and a pressure of the gas flowing through the power plant for controlling said regulating means, a plurality of nozzles receiving fuel from said regulating means for injecting fuel into said combustion section, means responsive to the fuel flow signal and a pressure of the gas flowing through the power plant for controlling the flow of fuel through at least one of said nozzles, said last mentioned means including a snap action servo movable in two directions, and means for actuating said servo at a different value of said signals depending upon the direction of actuation.

5. In a fuel control for a gas turbine power plant including a main combustion section and an afterburner, means for regulating the flow of fuel to said main combustion section, second means for regulating the flow of fuel to said afterburner, a power lever, means responsive to the position of said power lever and a power plant gas pressure for controlling said first means, a plurality of nozzles receiving fuel from said second means for injecting fuel into said afterburner, and means responsive to a function of fuel flow and a power plant gas pressure for controlling the flow of fuel through at least one of said nozzles, said last mentioned means including a snap action servo system.

6. In a fuel control for a gas turbine power plant including a main combustion section and an afterburner, means for regulating the flow of fuel to said main combustion section, second means for regulating the flow of fuel to said afterburner, a power lever, means responsive to the position of said power lever and a power plant gas pressure for controlling said first means, a plurality of nozzles receiving fuel from said second means for injecting fuel into said afterburner, means providing a signal indication of fuel flow, means responsive to said fuel flow signal and a power plant gas pressure signal for controlling the flow of fuel through at least one of said nozzles, said last mentioned means including a snap action servo movable in two directions, and means for actuating said servo at a different value of said signals depending upon the direction of actuation.

7. In a gas turbine power plant having an afterburner, a plurality of sets of fuel nozzles for injecting fuel into said afterburner, means for regulating the flow of fuel to said nozzles, means responsive to a pressure of the gas flowing in the power plant for creating a first signal, a power lever, means responsive to the position of said power lever for producing a second signal, means for combining said signals for controlling said regulating means, means for adjusting the maximum and minimum flow limits for said regulating means, and means responsive to a function of the flow through said regulating means and one of said signals for regulating the flow of fuel through at least some of said sets of nozzles.

8. In a power plant according to claim 7 including means for adjusting the response of said last mentioned means.

9. In a gas turbine power plant having an afterburner, a plurality of fuel nozzles for injecting fuel into said afterburner, means for regulating the flow of fuel to said nozzles, means responsive to a pressure of the gas flowing in the power plant for creating a first signal, a power lever, means responsive to the position of said power lever for producing a second signal, means for combining said signals for controlling said regulating means, means for adjusting the maximum and minimum flow limits for said regulating means, and means responsive to the position of said regulating means and said first signal for regulating flow through only some of said nozzles.

10. In a power plant having an afterburner, a plurality of fuel nozzles for injecting fuel into said afterburner, means for regulating the flow of fuel to said nozzles, means responsive to a gas pressure in the power plant for creating a first signal, a power lever, means responsive to the position of said power lever for producing a second signal, means for combining said signals for controlling said regulating means including means providing a third signal indication of fuel flow, and means for regulating the flow through some of said nozzles including a servo device, means responsive to said first signal and said third signal for controlling said servo device and moving said device only to its extreme positions.

11. In a power plant having a compressor and a main combustion chamber and an afterburner, means for regulating the flow of fuel to said afterburner, a power lever, means responsive to power lever position and a variable of power plant operation indicative of power output for controlling said regulating means, means including two sets of nozzles for injecting fuel into said afterburner, means for regulating the flow of fuel through one of said sets of nozzles in proportion to power lever movement and said variable of power plant operation.

12. In a power plant having an afterburner, a plurality of fuel nozzles for injecting fuel into said afterburner, means for regulating the flow of fuel to said nozzles, means responsive to a power plant pressure for creating a first signal, a power lever, means responsive to the position of said power lever for producing a second signal which is proportional to movement of said lever, means for combining said signals for controlling said regulating means, and means responsive to a function of said signals for regulating the flow of fuel through at least one of said nozzles.

13. In a fuel control for a power plant having a combustion section, means for regulating the flow of fuel to said combustion section including a throttle valve, a power lever, first signal means providing a signal proportional to the setting of said lever, second signal means producing a second signal proportional to compressor discharge pressure, a multiplying linkage for multiplying said signals, including a pivotable member connected to said valve, one end of said member being movable in proportion to the valve of said second signal, means providing a predetermined signal schedule independent of said second signal, the position of the other end of said member being determined by said predetermined signal schedule, an adjustable stop for producing a third signal, and means for establishing a position in said other end of said member in response to said third signal.

14. In a fuel control for a power plant having a combustion section, a source of fuel under pressure, means for controlling the flow of fuel from said source to said combustion section including a throttle valve, a power lever, means responsive to the position of said lever for producing a first signal, means responsive to compressor discharge pressure for producing a second signal, a multiplying linkage for multiplying said signals, including a pivotable member connected to said valve, one end of said member being moved in proportion to the valve of said second signal, means for limiting the movement of said valve including a first adjustable stop providing a pivot for the lower end of said pivotable member and a second adjustable stop providing a second pivot for said pivotable member, wherein said pivotable member pivots about one of said adjustable stops independently of the other adjustable stop, said pivotable member having a cam surface cooperating with at least one of said stops.

References Cited in the file of this patent

UNITED STATES PATENTS

| | | |
|---|---|---|
| 2,498,939 | Bobier | Feb. 28, 1950 |
| 2,508,420 | Redding | May 23, 1950 |
| 2,566,373 | Redding | Sept. 4, 1951 |
| 2,649,108 | Best et al. | Aug. 18, 1953 |
| 2,667,743 | Lee | Feb. 2, 1954 |
| 2,683,349 | Lawrence | July 13, 1954 |
| 2,691,268 | Prentiss | Oct. 12, 1954 |
| 2,699,037 | Davies et al. | Jan. 11, 1955 |
| 2,714,803 | Abild | Aug. 9, 1955 |
| 2,724,239 | Fox | Nov. 22, 1955 |
| 2,742,755 | Davies et al. | Apr. 24, 1956 |
| 2,746,242 | Reed | May 22, 1956 |
| 2,778,191 | Thompson | Jan. 22, 1957 |
| 2,802,335 | Skellern | Aug. 13, 1957 |
| 2,821,065 | Starkey | Jan. 28, 1958 |
| 2,916,876 | Colley et al. | Dec. 15, 1959 |
| 2,941,602 | Coar | June 21, 1960 |

FOREIGN PATENTS

| | | |
|---|---|---|
| 683,175 | France | Feb. 24, 1930 |
| 1,109,146 | France | Sept. 21, 1955 |

UNITED STATES PATENT OFFICE
CERTIFICATE OF CORRECTION

Patent No. 2,988,875                                              June 20, 1961

Thomas P. Farkas

It is hereby certified that error appears in the above numbered patent requiring correction and that the said Letters Patent should read as corrected below.

Column 5, line 26, for "valves" read -- valve --; column 7 lines 9 and 25, for "valve", each occurrence, read -- value --.

Signed and sealed this 5th day of December 1961.

(SEAL)
Attest:

ERNEST W. SWIDER                          DAVID L. LADD
Attesting Officer                           Commissioner of Patents
                                                                           USCOMM-DC